United States Patent [19]
Echeita et al.

[11] Patent Number: 5,826,165
[45] Date of Patent: Oct. 20, 1998

[54] ADVERTISEMENT RECONCILIATION SYSTEM

[75] Inventors: Richard J. Echeita, Redondo Beach; James E. Yokers, Castaic, both of Calif.

[73] Assignee: Hughes Electronics Corporation, El Segundo, Calif.

[21] Appl. No.: 784,665

[22] Filed: Jan. 21, 1997

[51] Int. Cl.⁶ .................................................. H04N 7/08
[52] U.S. Cl. ............................ 455/2; 455/3.2; 348/907; 348/3; 348/1
[58] Field of Search .................... 348/1, 3, 461, 348/467, 458, 473, 476, 907, 10; 455/2, 3.2

[56] References Cited

U.S. PATENT DOCUMENTS

| | | |
|---|---|---|
| 3,845,391 | 10/1974 | Crosby . |
| 4,025,851 | 5/1977 | Haselwood et al. . |
| 4,547,804 | 10/1985 | Greenberg . |
| 4,694,490 | 9/1987 | Harvey et al. . |
| 4,965,825 | 10/1990 | Harvey et al. . |
| 5,425,100 | 6/1995 | Thomas et al. .......................... 348/1 X |
| 5,450,122 | 9/1995 | Keene .......................................... 348/1 |
| 5,450,134 | 9/1995 | Legate .................................. 348/907 X |
| 5,574,962 | 11/1996 | Fardeau et al. ...................... 348/907 X |
| 5,584,050 | 12/1996 | Lyons .......................................... 348/1 |

*Primary Examiner*—Nathan J. Flynn
*Attorney, Agent, or Firm*—Michael W. Sales; John A. Crook

[57] ABSTRACT

The apparatus and method of the present invention utilize the digital packetized transmission features of a direct broadcast satellite (DBS) system to provide an automated and efficient method of conducting advertisement reconciliation. The apparatus and method of the present invention inserts advertisement reconciliation data packets into the transmitted DBS data stream. Preferably, the inserted reconciliation data packets are transmitted synchronously with the advertisement data packets to which they are related. The reconciliation data may include data identifying the date on which the advertisement is aired, the time at which the advertisement is aired, the duration of the advertisement as aired, the contract number under which the advertisement was purchased, the particular order line number of the contract under which the advertisement was purchased, the "makegood" status (indicates whether the advertisement is a makegood an advertisement that was missed), the scheduled time and duration of the advertisement, and an identification code identifying a particular advertisement.

27 Claims, 11 Drawing Sheets

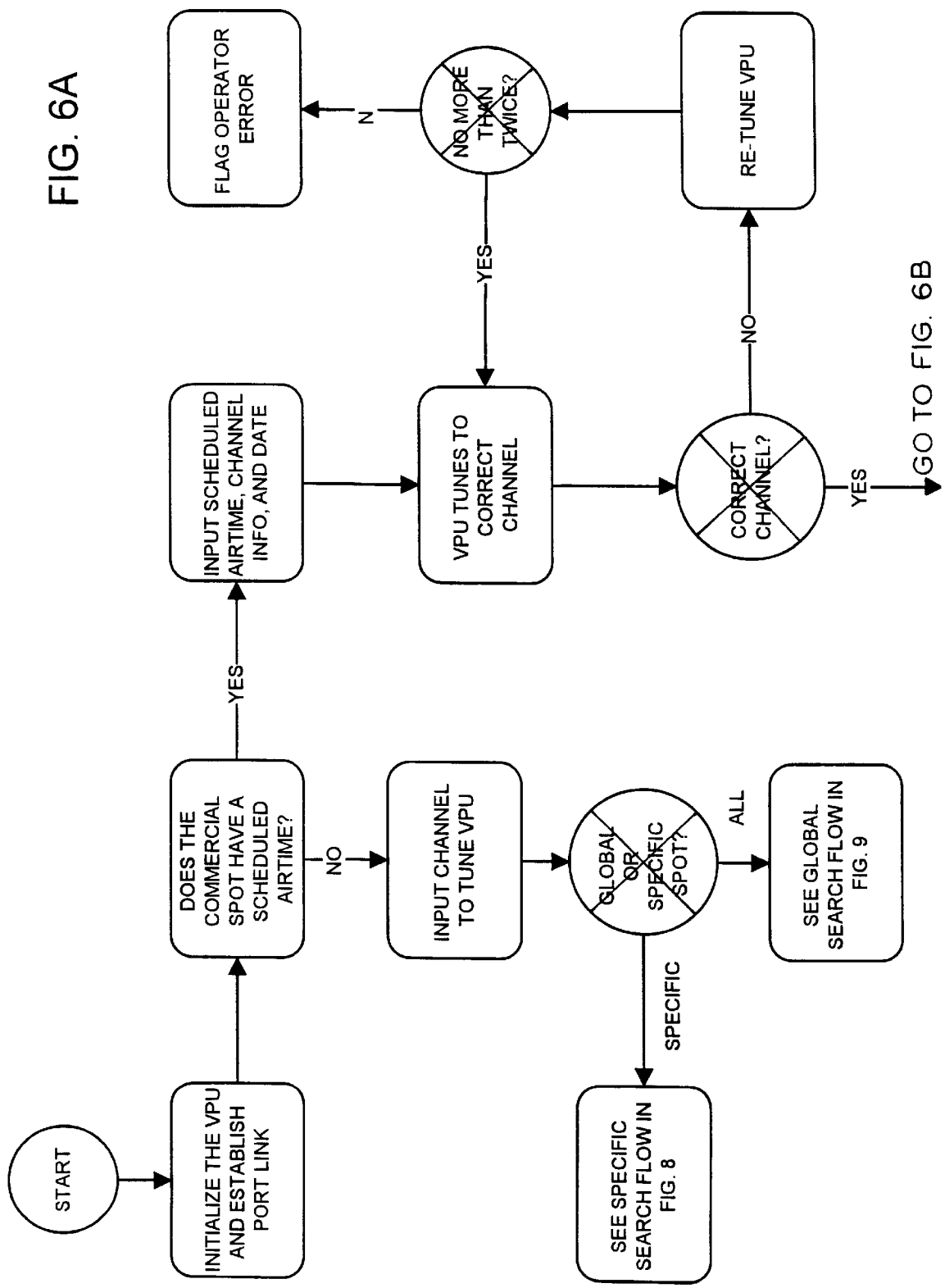

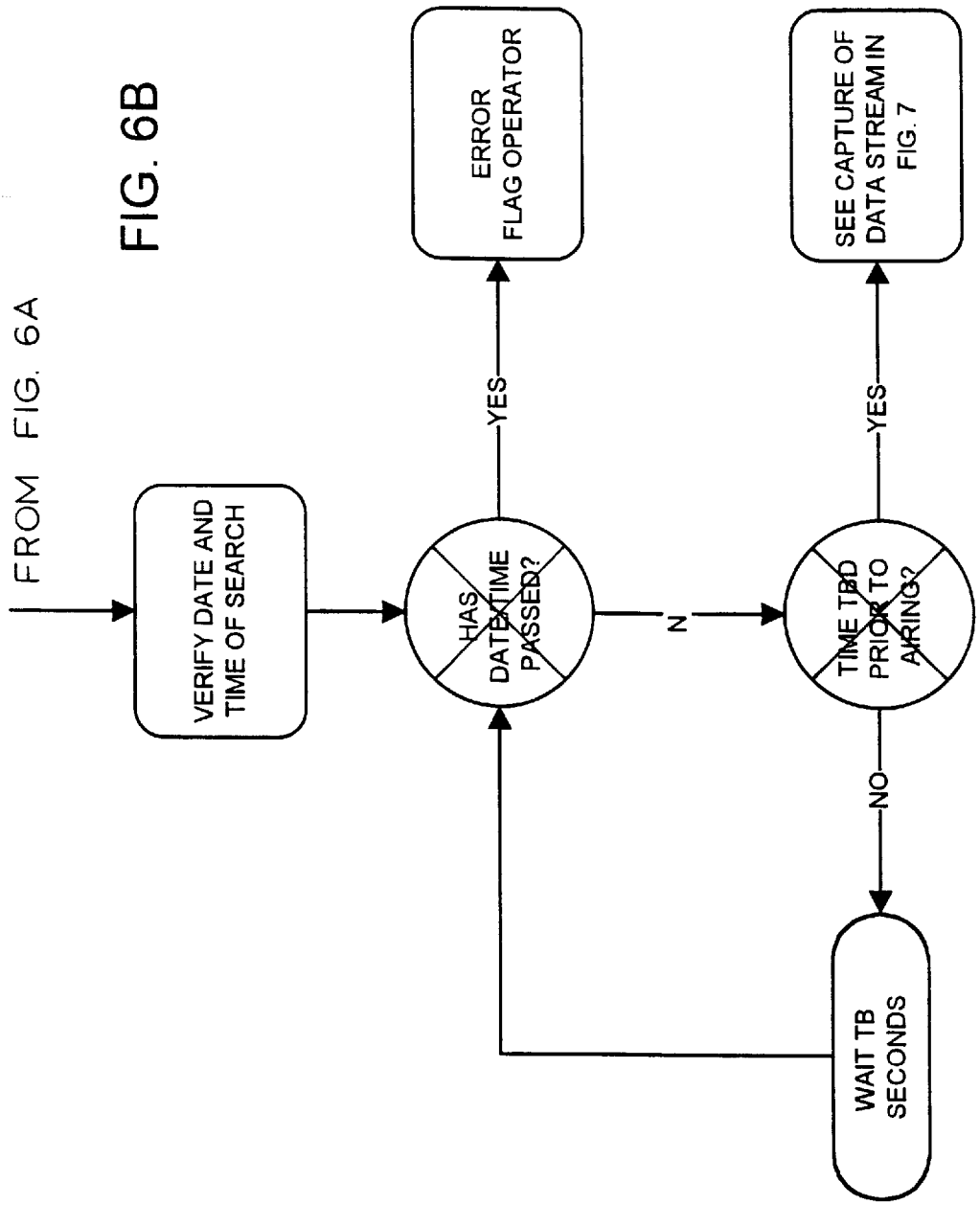

ADVERTISEMENT RECONCILIATION SYSTEM

BACKGROUND OF THE INVENTION

Advertisers regularly pay considerable amounts of money to air their commercials during designated portions of a television program. The decision to purchase a particular advertising time slot can be based on a variety of factors such as the number of viewers that have historically watched the program, whether the time slot is early, late or in the middle of the program, the age, sex or particular purchasing habits of the viewers, and other factors.

With the success of multi-channel television programming transmission systems such as cable and direct broadcast satellite (DBS) systems, advertisers now have hundreds of channels per market to choose from, thus increasing the ability to even further target desired audiences. However, the increased number of channels has also increased the difficulty of confirming that advertisers received what they paid for. More particularly, there is need to confirm that commercials aired during the contracted program, at the contracted times, for the contracted duration, and for the contracted number of times. This process is known generally as "advertisement reconciliation." Ordinarily, advertisement reconciliation is done manually by a person viewing a particular channel at a particular time to confirm that the correct commercial was aired during the correct program and for the correct duration.

Previous attempts to automate advertisement reconciliation activities have involved some sort of advertisement identification signal being embedded in another different type of signal, for example a scan line of an analog video commercial. Examples of this approach are shown in U.S. Pat. Nos. 3,845,391; 4,025,851; 4,547,804; 4,694,490; and 4,965,825. Because the identification signals are typically digital, the devices and methods disclosed in the above patents suffer from the added complexity associated with having to transmit, receive and process two distinctly different types of signals. This requires specially designed transmitter and receiver units having specially designed circuitry that can transmit, receive and process both digital identification signals and standard analog television programming signals.

With the large number of channels that are now available through cable and DBS, there is a need for an efficient and effective device and method for performing advertisement reconciliation without requiring specialized transmitters and receivers that are significantly different from the transmitters and receivers that ordinarily process the television programming signals.

SUMMARY OF THE INVENTION

The apparatus and method of the present invention utilize the digital packetized transmission features of a direct broadcast satellite (DBS) system to provide an automated and efficient method of conducting advertisement reconciliation. The present invention performs advertisement reconciliation without requiring transmitters and receivers that are significantly different from those that are used in connection with the standard DBS programming signals. According to the apparatus and method of the present invention, advertisement reconciliation data packets are inserted as one of the data packets of a DBS data stream. Preferably, the inserted reconciliation data packets are transmitted synchronously with at least one of the advertisement data packets to which they are related. Because the reconciliation data are packets inserted into an existing data stream, they can include far more information than just a code identifying a particular commercial. For example, the reconciliation data may identify the date on which the advertisement is aired, the time at which the advertisement is aired, the duration of the advertisement as aired, the contract number under which the advertisement was purchased, the particular order line number of the contract under which the advertisement was purchased, the "makegood" status (which indicates whether the advertisement makes up for an advertisement that was missed), the scheduled time and duration of the advertisement, and any other information that is desired by either the broadcaster or the advertiser. Some or all of these data may be assembled, processed and packaged for transmission, along with the associated commercial in real-time or near-real-time, such as just prior to or during transmission of the related commercial.

In general, a DBS system that can be utilized with the method and apparatus of the present invention is of the type that allows consumers to receive directly in their homes several television channels broadcast from at least one powerful geosynchronous satellite. The receiver may typically include a small 18 inch satellite dish antenna connected by a cable to a video processor unit. The dish is aimed toward the satellites, and the processor unit is connected to the user's television or other output device in a similar fashion to a conventional cable decoder unit.

On the transmission side, video and audio programming signals (which includes advertisements), electronic program scheduling information, programming access data, the reconciliation data, and other information, are digitally encoded in a conventional manner into a packetized data stream using a number of algorithms, including convolutional error correction and digital video compression. The encoded data stream is punctured to reduce bandwidth requirements, modulated to e.g. Ku-band frequency, transmitted to the satellite, and relayed from the satellite to the receiving antenna. In a representative DBS system, the Ku-band signal is shifted down to an L-band signal and transmitted through a cable to a video processor unit. The video processor is optionally connected to a variety of peripherals, including a television monitor, a video-tape recorder, an audio processor, a printer, a computer, or a billing and accounting system.

In the video processor unit, front-end circuitry receives the input (e.g. L-band) signal and converts it back into the transmitted packetized data stream. The packetized data stream is then fed to a transport circuit which routes the data packets to various portions of the video processor unit according to instructions coordinated by a microcontroller. The microcontroller controls the overall operation of the receiver, including the selection of operating parameters, channel selection, viewer access to different programming packages, blocking certain channels, and many other functions. Video and audio programming data packets which include associated advertisement data packets, are routed through video/audio decoders and appropriate digital-to-analog circuitry in order to recover NTSC video capable of being displayed on a conventional television set.

In the present invention, the microcontroller is programmed to, inter alia, accept certain parameters from the user related to the advertisement of interest, send control signals to certain peripheral units such as a video tape recorder, control the transport circuit to identify the received reconciliation data packets and/or the received advertisement, and route the reconciliation data packets to appropriate portions of the video processor unit for processing and/or analysis. The video processor unit may also record additional reconciliation data, such as the actual time at which the broadcast was received. Once assembled at the receiving station, the reconciliation data may be manipulated in a variety of ways. For example, the assembled reconciliation data my be sent to a computer for additional processing such as comparing the assembled reconciliation data with the various contractually agreed-upon parameters, and identifying any discrepancies between the two. The computer could route the reconciliation data and/or the processed reconciliation data locally or over any known data communication system to a printer for printing a report, or to a billing and accounting system that would use the reconciliation data to finalize the sale and initiate billing.

The present invention is embodied in a method of determining the receipt of an advertisement. The steps of the method include receiving digital data comprising programming, an advertisement and advertisement reconciliation data. The advertisement reconciliation data includes a scheduled air time and an actual air time associated with the advertisement. The advertisement reconciliation data may further include a scheduled date associated with the advertisement, a scheduled duration of the advertisement, an identification code identifying the advertisement, the contract number under which the advertisement was purchased, an order line number of a contract under which the advertisement was purchased, and a makegood status of the advertisement. The received advertisement reconciliation data is passed to a local or remote processor, printer, or billing center.

The present invention is also embodied in a method of broadcasting advertisements. The steps of the method include generating digital data comprising an advertisement and advertisement reconciliation data. The advertisement reconciliation data includes at least a time at which the advertisement is scheduled to be broadcast. The advertisement reconciliation data may further include a scheduled date associated with the advertisement, a scheduled duration of the advertisement, an identification code identifying the advertisement, the contract number under which the advertisement was purchased, an order line number of a contract under which the advertisement was purchased, and a makegood status of the advertisement. The digital signals are modulated on a carrier and broadcast on a carrier frequency suitable for reception by a relay satellite. The satellite receives the modulated digital data at the carrier frequency, shifts it to a second carrier frequency, then re-broadcasts it to ground-based receiver units.

The present invention is further embodied in a device for confirming the transmission of television advertisements. The device includes an antenna in communication with a tuner, a demodulator, a data transport, and a microcontroller. The antenna may be a satellite dish that receives a modulated digital data stream comprising programming, advertisements and advertisement reconciliation data. The tuner receives the modulated digital data stream at a designated carrier frequency. The demodulator receives and demodulates the modulated digital data stream. The transport receives the data stream and routes the data packets based on overhead data in each packet. The transport generally routes the advertisement reconciliation data to the microcontroller.

In the above-described device, the tuner, demodulator and transport may be housed in a video processor unit coupled to the antenna. The microcontroller may be housed in the video processor unit, or in a computer coupled to the video processor unit. The advertisement reconciliation data may be fed to a printer which is in communication with the processor. The advertisement reconciliation data may include a scheduled date associated with the advertisement, a scheduled duration of advertisement, an identification code identifying the advertisement, a contract number under which the advertisement was purchased, a makegood status of the advertisement, a scheduled date for receipt of the advertisement.

The invention itself, together with further objects and attendant advantages, will best be understood by reference to the following detailed description, taken in conjunction with the accompanying drawings.

BRIEF DESCRIPTION OF THE DRAWINGS

FIGS. 6a and 6b are flow diagrams illustrating program instructions that are executed by the computer/microcontroller shown in FIGS. 1 and 2.

DESCRIPTION OF THE PREFERRED EMBODIMENTS

The present invention is embodied in a substantially automated advertisement reconciliation system that allows independent gathering of the various attributes and/or parameters of actual advertisement as broadcast. Once gathered, the attributes/parameters are compared with contractually agreed upon attributes/parameters. This comparison step is known generally as advertisement reconciliation. Ordinarily, the information needed to perform advertisement reconciliation is gathered manually by a person viewing a particular channel at a particular time to confirm that the correct commercial was aired during the correct program and for the correct duration. Attempts to automate the process have involved some sort of advertisement identification signal being embedded in another different type of signal, for example a scan line of an analog video commercial. Examples of this approach are shown in U.S. Pat. Nos. 3,845,391; 4,025,851; 4,547,804; 4,694,490; and 4,965,825. Because the identification signals are typically digital, the devices and methods disclosed in the above patents suffer from the added complexities of having to assemble, transmit, receive and process two distinctly different types of signals. This requires specially designed transmitter and receiver units having specially designed circuitry that can assemble, transmit, receive and process digital signals and standard analog video/audio programming signals. In contrast, the apparatus and method of the present invention utilize the digital packetized transmission features of a direct broadcast satellite (DBS) system to provide an automated and efficient method of conducting advertisement reconciliation. According to the present invention, advertisement reconciliation data packets are inserted into the data stream, synchronized with the data packets that make up the actual advertisements to which the reconciliation data is related. The reconciliation data packets can include, for example, the date on which the advertisement was broadcast, the time at which the advertisement was broadcast, the duration of the advertisement that was broadcast, the contract number, the order line number of the contract, the make good status of the advertisement, the range of the time period to be aired, and the spot number identifying the actual advertisement.

Figure 1:
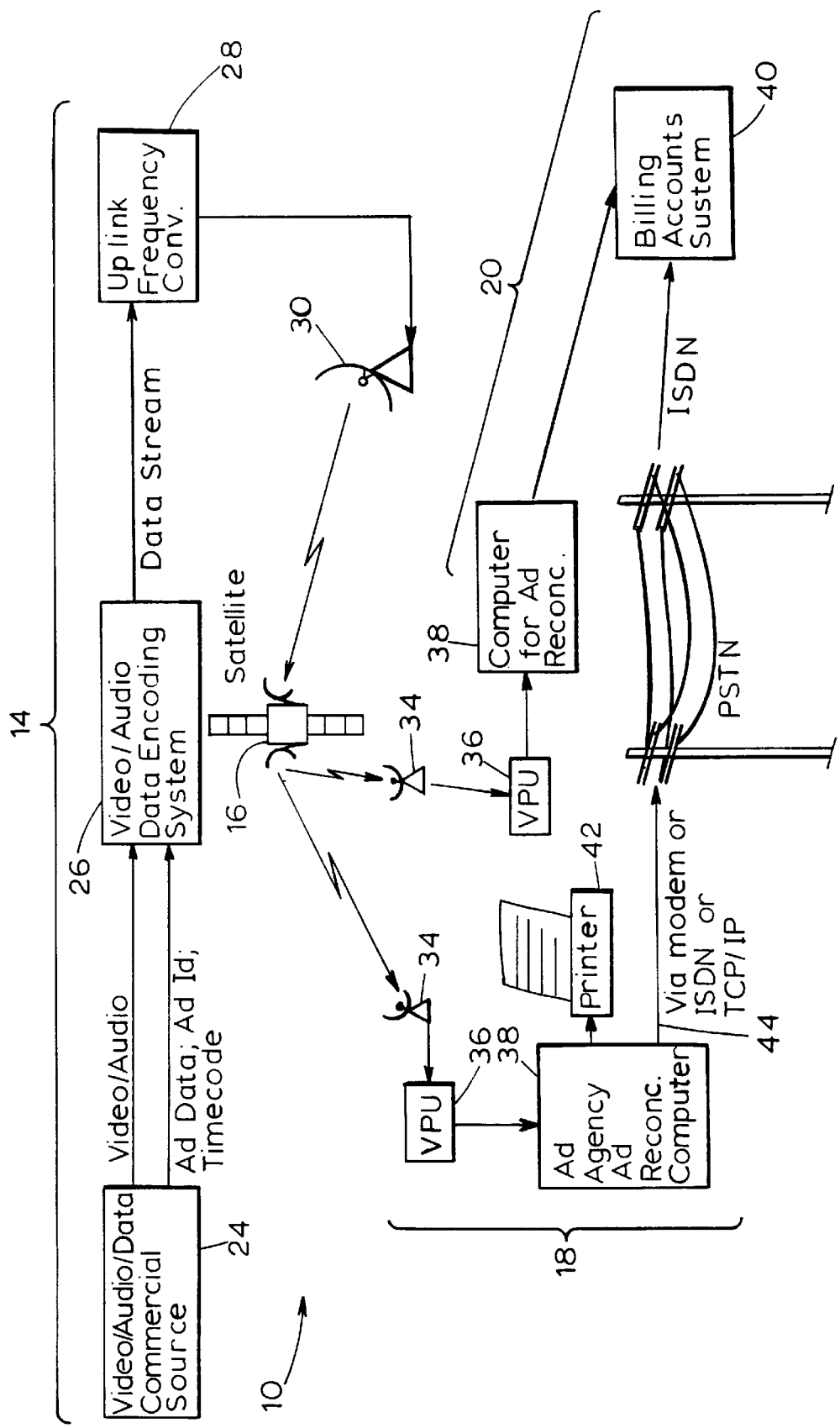
FIG. 1 is a block diagram of a direct broadcast satellite (DBS) transmission and reception system embodying features of the present invention.

FIG. 1 is a block diagram of a DBS transmission and reception system 10 embodying features of the present invention. The illustrated system 10 includes a transmission station 14, a relay 16 and first and second receiving stations 18, 20. A wireless airlink provides the communications medium between the transmission station 14, the relay 16, and the receiving stations 18, 20. The transmission station 14 includes a source of advertisement video/audio/data 24, a video/audio/data encoding system 26, an uplink frequency converter 28 and an uplink satellite antenna 30. The relay 16 is preferably at least one geosynchronous satellite. There are two receiving stations shown. The first receiving station 18 is designed for use by a program provider, and includes a satellite reception antenna/dish 34, a video/audio processor unit 36, a computer 38, and a billing and accounting system 40. The second receiving station 20 is designed for use by an advertiser, and includes the same type of satellite reception antenna/dish 34, a video/audio processor unit 36, and computer 38, found in the first receiving station 18, but adds a printer 42 and a modem connection 44 from the computer 38 to the program provider's billing and accounting system 40.

In operation, the transmission station 14 receives programming signals from a number of sources, including satellites, terrestrial fiber optics, cable, or tape. The programming includes advertisements typically in the form of 30 second commercial spots. Alternatively, the advertisements may be received separately and inserted into the programming.

The received programming and advertisements, along with data signals such as the advertisement reconciliation data, electronic program guide data, and security access data, are sent to the video/audio data encoding system 26 where they are digitally encoded into a packetized data stream using a number of algorithms, including convolutional error correction and compression. In a conventional manner, the reconciliation data is coordinated with a particular commercial spot and encoded into data packets that accompany the data packets that form the actual advertisement. The encoded data stream is modulated and sent through the uplink frequency converter 28 which converts the modulated encoded data stream to a frequency band suitable for reception by the satellite 16. Preferably, the satellite frequency is Ku-band. The modulated, encoded data stream is then routed from the uplink frequency converter 28 to an uplink satellite antenna/dish 30 where it is broadcast toward the satellite 16 over the airlink. The satellite 16 receives the modulated, encoded Ku band data stream and rebroadcasts it downward toward an area on earth that includes the locations of the 18-inch satellite dishes that form part of the first and second receiving stations 18, 25 20. The 18-inch satellite dishes 34 shift the Ku-band signal down to an L-band signal which is transmitted to the video processor units 36.

In the first receiving station 18, which is intended for use by the programming provider, the video processor unit 36 is connected to a conventional computer 38 which is coupled to the program provider's billing and accounting system 40. In the second receiving station 20, which is intended for use by the advertiser, the video processor unit 36 is connected to a conventional computer 38, which is further coupled to a printer 42. The unit 36 outputs data over a modem connection 44 to the program provider's billing and accounting system 40. In either case, the receiver 18, 20 includes a small e.g. 18-inch satellite antenna/dish 34 connected to a video processor unit 36. The satellite dish 34 is aimed at the satellite 16, and the video processor unit 36 can be connected to a television (not shown) in a similar fashion to a conventional cable decoder box. The satellite dish 34 receives Ku-band signals from the satellite 16, shifts the Ku-band signals down to L-band, and transmits the L-band signals to the video processor unit 36. Front-end circuitry (shown in FIG. 2) inside the unit 36 receives the L-band RF signals and converts them back into the original digital data stream of video/audio signals. Decoding circuitry (shown in detail in FIG. 2), receive the original data stream and perform video/audio processing operations such as demultiplexing and decompression. A microcontroller 58 (also shown in FIG. 2) controls the overall operation of the receiver, including the selection of parameters, the set-up and control of components, channel selection, viewer access to different programming packages, blocking certain channels, and many other functions.

Figure 2:
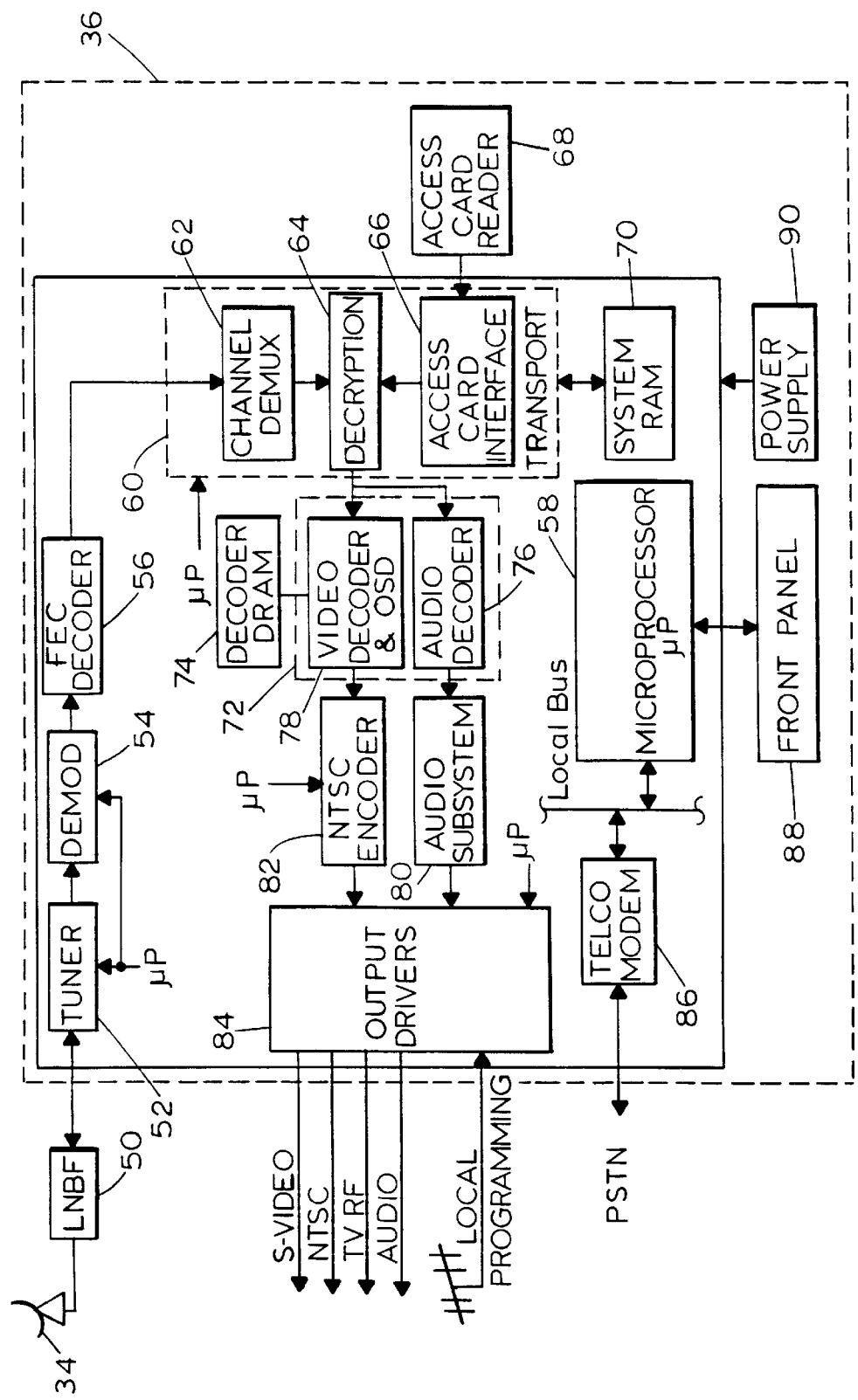
FIG. 2 is a block diagram of the video processing portion of the reception station shown in FIG. 1.

FIG. 2 is a more detailed block diagram of a portion of the video processor unit 36 shown in FIG. 1. The satellite dish antenna 34 transfers the received satellite signal to a conventional low noise block (LNB) circuit 50 which then passes the signal to the video processor 36. The video processor 36 includes a tuner 52, demodulator 54, FEC decoder 56, a microcontroller 58, a transport circuit 60, a channel demultiplexer 62, decryption circuit 64, an access card interface 66, an access card reader 68, a system RAM 70, an audio/video decoder circuit 72 having a random-access-memory (RAM) 74, audio decoder 76, video decoder 78, an audio digital-to-analog circuit 80, an NTSC encoder 82, output drivers 84, a modem connection 86, a front panel user interface 88, and a power supply 90, coupled together as illustrated. The transport 60 receives the transport stream of digitized data packets containing video, audio, program scheduling information, and other data. The digital packet information contains identifying headers as part of its overhead data. Under control of the microcontroller 58, the channel demultiplexer 62 filters out packets that are not currently of interest, and routes the data packets that are of interest through the decryption and access control circuits 64, 66, 68 to their proper downstream destination. The decryption circuit 64 provides decryption for the data packets that have been encrypted. The access control circuits 66, 68 provide access control by any conventional means. For example, access control may be achieved by requiring a data packet to have a proper authorization code in order to be passed to the decryptor 64 and/or video decoder 78. The access card reader 68 can interface with an access card (not shown) that will receive the packet authorization code, determine its validity, and generate a code that confirms to the transport 60 that the subject data packet is authorized.

The authorized data of interest are stored in system RAM 70 for buffering, and the audio/video decoder 72 requests (via the microcontroller 58) the RAM 70 contents as needed. The requested data is routed from the RAM 70 through the transport 60 to the audio/video decoder 72. If the request is for video programming data, video programming data in the RAM 70 are routed through the transport 60 to the video/audio decoder's DRAM 74 until it is time for the data to be decoded. At that time, the data is routed to the video decoder 78 (which includes on-screen display circuitry) and the NTSC encoder 64. The video decoder 78 reads in the compressed video data from the DRAM 74, parses it, creates quantized frequency domain coefficients, then performs an inverse quantization, inverse discrete cosine transform (DCT) and motion compensation. At this point, an image has been reconstructed in the spatial domain. This image is then stored in a frame buffer in the DRAM 74. At a later time, the image is read out of the frame buffer in DRAM 74 and passed through the on-screen display circuitry to the NTSC encoder 82. The on-screen display circuitry (located in the video decoder 78 generates the graphics that allow text such an the electronic program guide data to be displayed on the television screen. The NTSC encoder 78 converts the digital video signals to analog according to the NTSC standard, thereby allowing video to be displayed on a conventional television set.

According to the present invention, the microcontroller 58 is capable of controlling the transport 60 to identify certain advertisement reconciliation data in the received data stream. The advertisement reconciliation data was digitized and multiplexed into the transport data stream at the transmission center. A convenient point for the ad reconciliation data to be inserted is when the commercial spots are processed and incorporated into the data stream at the transmission station. In some situations, the video programming received at the transmission station includes standard DTMF tones that identify the particular location at which a commercial should be inserted. Thus, along with the commercial, digital advertisement reconciliation data, synchronized with the advertisement video and audio content, is multiplexed in with the other components of the data stream. The advertisement reconciliation data's synchronization with a particular commercial is preferably defined by providing proper identifying overhead information with ad reconciliation data that identifies the ad reconciliation data as part of the data packets that should be assembled whenever the associated commercial's data packets are assembled. When the channel demultiplexer 62, under control of the microcontroller 58, filters out packets that are not currently of interest, and routes the data packets that are of interest through the decryption and access control circuits 64, 66, 68, the advertisement reconciliation data associated with the commercials broadcast over the chosen channel are also identified as being data packets of interest. The microcontroller 58 controls the transport 60 to route the assembled advertisement reconciliation data to the microcontroller 58 which can then add a time and/or duration data to the received advertisement data, and forward it for processing.

Figure 3:
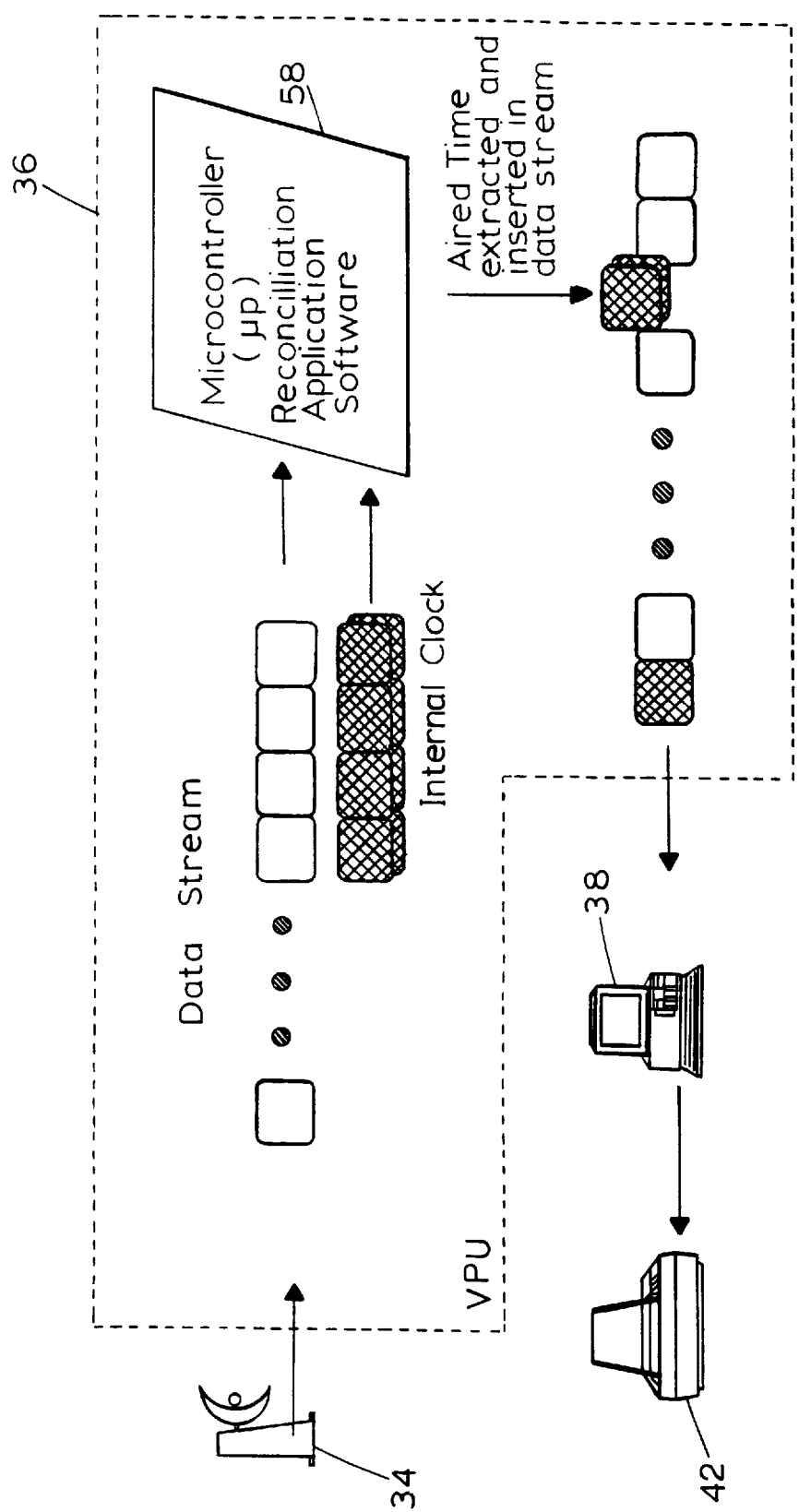
FIGS. 3 and 4 are block diagrams illustrating generally how time information may be added to the data received at the receiving stations shown in FIG. 1.
Figure 4:
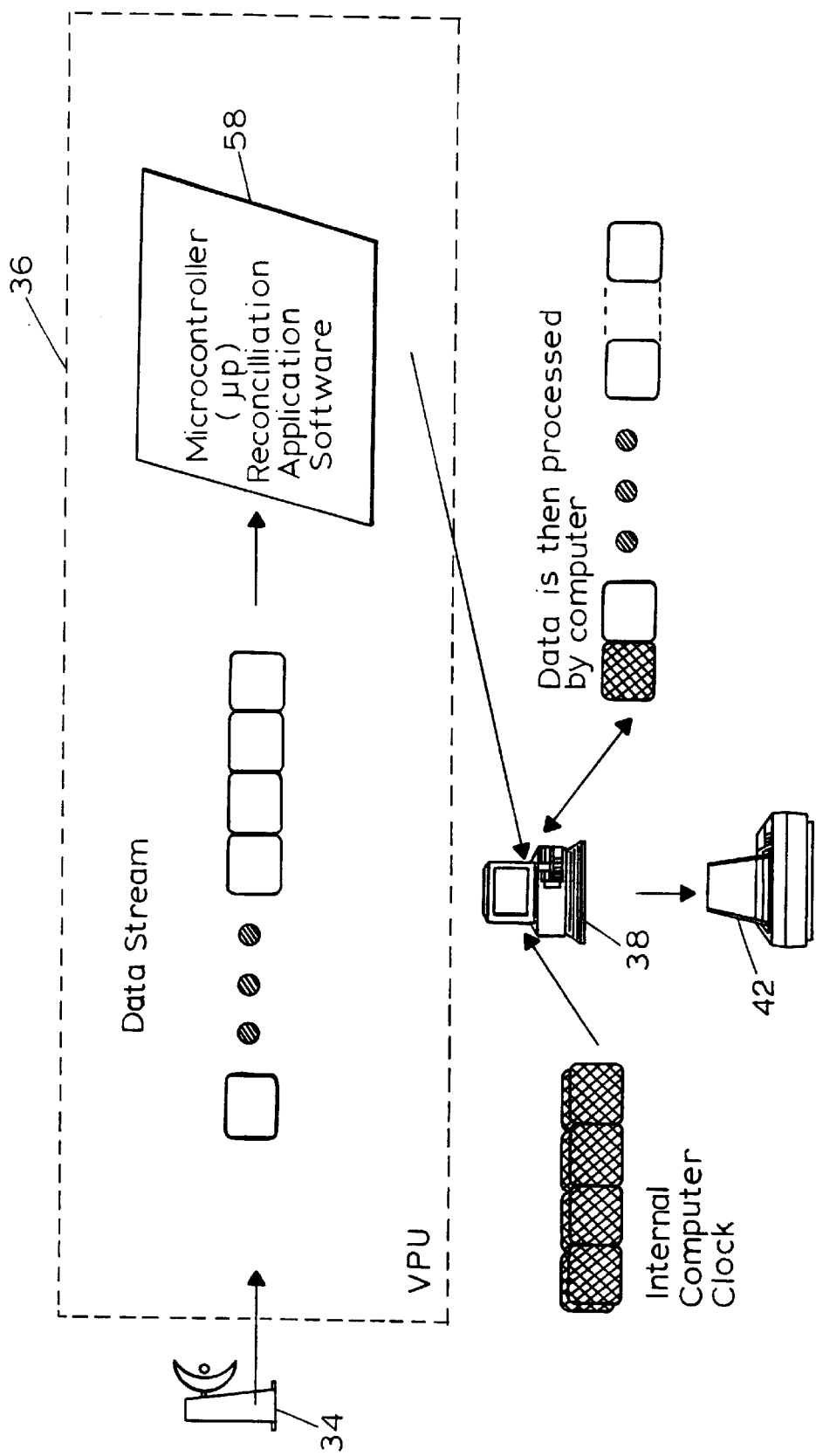

FIGS. 3 and 4 are block diagrams illustrating generally the advertisement reconciliation data's path through the receiver station 18, 20. More particularly, FIGS. 3 and 4 illustrate how the "aired time" information is added to the advertisement reconciliation data by the receiver station 18, 20. As shown in FIG. 3, in a conventional manner, the video processor unit's local clock can be set according to time information provided with the transmitted data stream, and this local time is used for a variety of operations such as synchronizing the MPEG output of video and audio. Local time could be extracted from the local clock when advertisement reconciliation data is collected, and the time-stamped advertisement reconciliation data could then be forwarded to the PC 38 for processing, or processed on-board the video processing unit 32. FIG. 4 illustrates an alternative embodiment in which the extracted reconciliation data is routed through the PC 38, and the PC's local clock is used to ad the time-stamp information. The time-stamped reconciliation data could then remain with the PC 38 for further processing, or be routed back to the video processing unit 32 for further processing.

Figure 5:
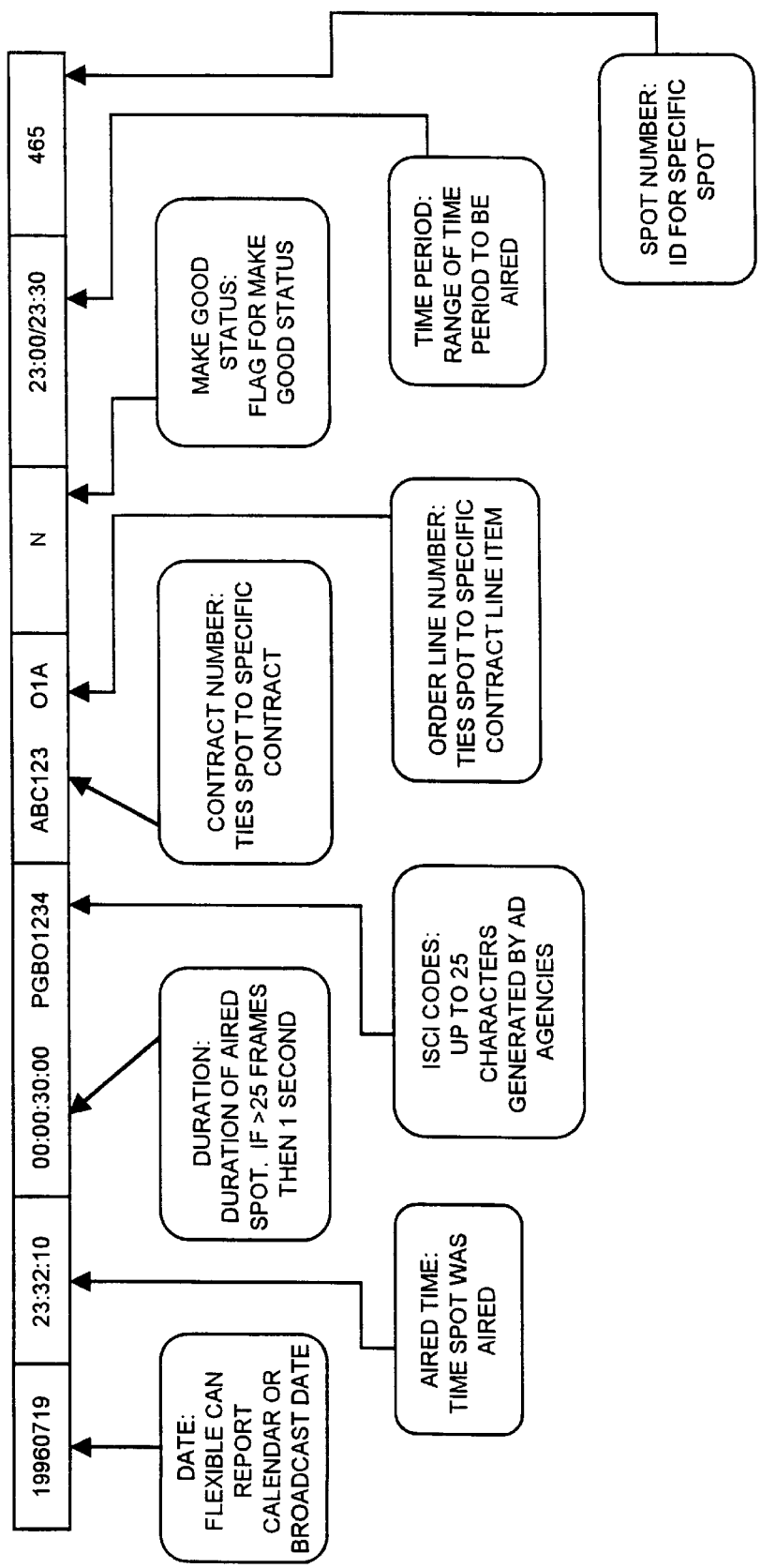
FIG. 5 is a diagram of an advertisement reconciliation data stream that may be transmitted and processed by the system shown in FIGS. 1 and 2.

FIG. 5 is a diagram illustrating a typical advertisement reconciliation data stream that is transmitted via the system shown in FIGS. 1 and 2. The advertisement reconciliation data stream can include whatever information is desired or needed by the program provider and/or the advertiser. The advertising reconciliation data field shown in FIG. 5 includes nine data fields. These data fields are the broadcast date on which the commercial aired, the actual time at which the commercial aired, the actual duration of the commercial that aired, ISCI code (a code field utilized by advertisers), contract number associated with the commercial, the order line number of the contract associated with the commercial, the "make good" status, the time period ordered, and the spot number. For the example shown in FIG. 5, the date is Jul. 19, 1996, the actual air time was approximately 11:32 p.m., the duration of the commercial was 30 seconds, the ISCI code is PGBO1234, the contract number is ABC123, the order line number of the contract is identified as 01A, the make good status flag for this commercial is set at "no", the contracted time period range of the commercial to be aired was from 11:00 p.m. to 11:30 p.m., and finally the commercial's i.d. was 465. In general, the date data field should be flexible enough to report on either a calendar or a broadcast basis. The "time spot aired" information is preferably provided by the receiver stations 18, 20 time-stamping the reconciliation data according to the methods illustrated in FIGS. 3 and 4. Alternatively, the time information could be inserted in the reconciliation data at the transmission station 14. The duration of the commercial aired should be rounded up to full seconds if less than 25 frames aired. In general, most commercials are about 29.25 seconds and are purchased in 30 second units. Upcuts and downcuts would reflect a number lower than 25 frames (i.e. 29.01). The ISCI codes generally are eight characters, but some agencies will use more numbers with 25 typically being the maximum. The contract number data field allows the advertiser or the program provider to connect the particular commercial spot back to the specific contract under which the spot was purchased. The order line number data field allows the program provider and the advertiser to tie the particular commercial spot back to the specific part of a specific contract under which the commercial spot was purchased. The make good status field is a flag set to either yes or no. This allows the advertiser or the program provider to flag a commercial that is being aired as a make good for a commercial previously missed. The accounting procedures for reconciling the commercial can be traced by providing the contract number and the contract line number. The "time period ordered data field" allows the program provider and the advertiser to make an immediate judgment on whether the spot aired outside the time period under which it was specified. In the examples shown in FIG. 5, the spot aired at 11:32 and its ordered end time was 11:30. Therefore, this commercial spot has a discrepancy because it aired too late. The spot number data field is usually a unique number that connects the commercial to the days it was broadcast and gives the advertiser and the program provider a point of reference to research problems.

FIGS. 6–9 illustrate, via flow diagrams, the processing steps that can be carried out, primarily by the microcontroller 58, in implementing the method of the present invention. In particular, the flow diagrams of FIGS. 6–9 illustrate the operations that may be performed by either the video processing unit 36 alone, or the video processing unit 36 in tandem with a separate personal computer 38. In either event, the functional operations illustrated in FIGS. 6–9 would be carried out by a microcontroller, with the only difference being the exact location of the microcontroller (either in the video processor unit 36 or the separate computer 38).

The method of the present invention may proceed along one of two paths. The first path is a substantially automated operation in which the microcontroller 58 may be pre-programmed with the channel date and time of a particular commercial spot of interest. The microcontroller 58 uses that information to automatically tune to the proper channel on the proper date and at the proper time in order to capture the ad reconciliation data associated with the commercial. In the second path, the microcontroller 58 proceeds on a less automated course wherein no set time is input for the particular spot, and the user therefore inputs the channel to which the microcontroller 58 should tune.

As shown in FIGS. 6a and 6b, the first stage in the method of the present invention is to initialize the microcontroller 58 and establish a link with a particular port of the video processor unit 36. Next, the program determines whether the commercial spot has a scheduled air time. If the answer to this inquiry is no, the user must input the particular channel desired to be accessed by the microcontroller 58. The user then determines whether the search will be a specific search or a global search (this decision box is represented by a circle with an X inside). For a specific search, the program proceeds according to the diagram set forth in FIG. 8, and for a global search the program proceeds according to the diagram set forth in FIG. 9.

Returning to the "scheduled airtime" inquiry, if the answer to that inquiry is yes, the program proceeds to request an input of the scheduled air time, channel information, and date of the commercial spot of interest. The microcontroller 58 then tunes to the correct channel, and verifies the correct date and time of the search. When the system clock is approaching the scheduled time for the commercial spot, the program moves to the routine for capturing the data stream, which is set forth in detail in the flow diagram shown in FIG. 7.

Figure 7:
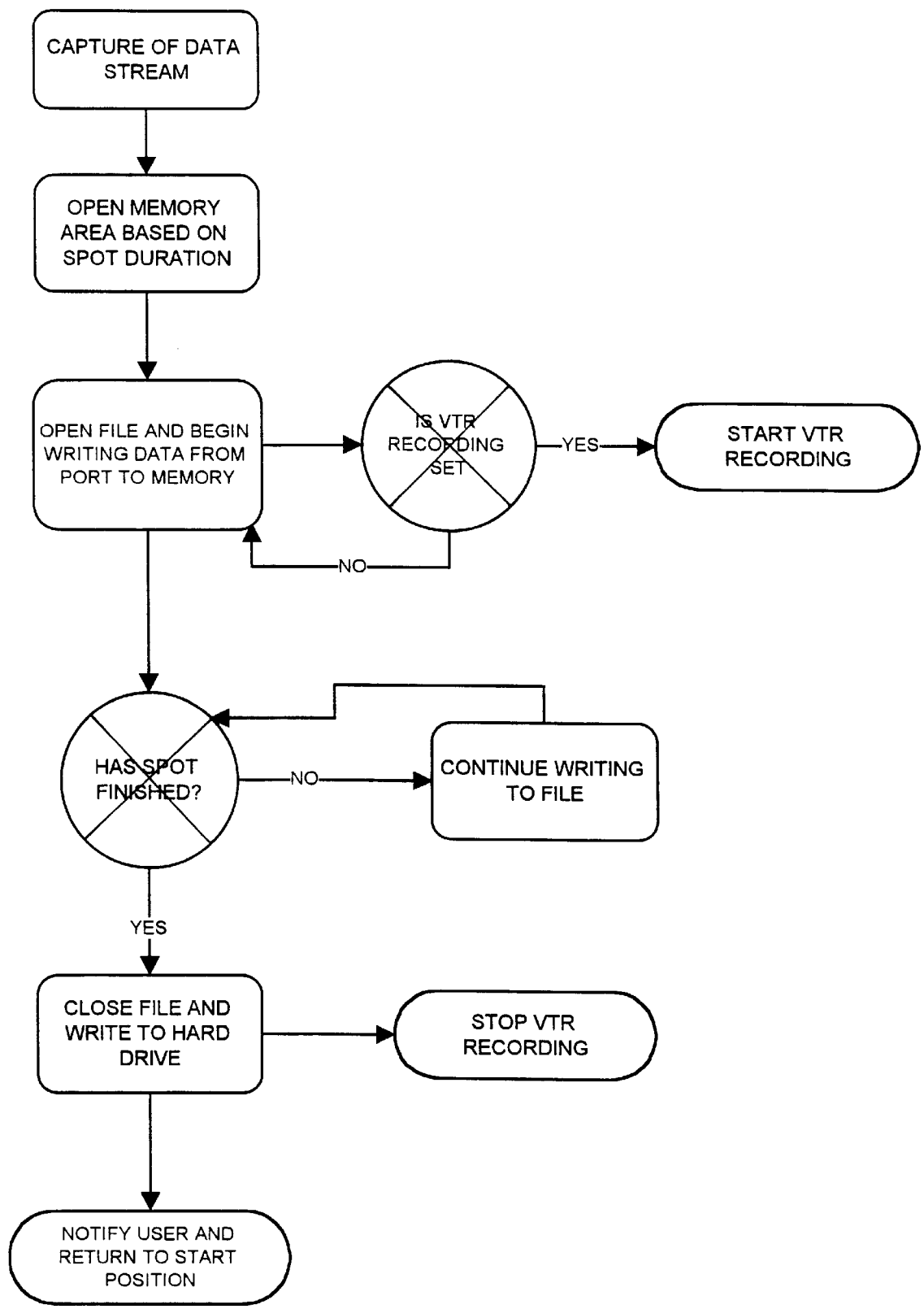
FIG. 7 is a flow diagram illustrating additional program instructions that are executed by the computer/microcontroller shown in FIGS. 1 and 2.

The flow diagram of FIG. 7 illustrates the procedure for capturing the data stream. The procedure begins by opening a memory area in the system RAM 70 or microcontroller 58 based on the spot duration. For a longer spot, more memory is opened, and for a shorter spot, less memory is opened. The program opens a particular file and begins writing data from the input port to the memory file. At this point, the option may be provided for initiating the recording function of a connected video recording device. This device could be used to automatically record and provide a video record of the commercial spot that was actually received. The program then monitors the timing of the received commercial and determines whether the commercial has finished. When the commercial duration is complete, the memory file is closed and the data stored therein is written to a hard drive. In situations where the functionality is performed completely by the video processor unit 36, the hard drive is located on board the unit 36. In situations where the functionality described herein is carried out by the separate computer 38, the hard drive is located in the computer and the contents of the memory file is transferred to the computer so that the information may be written directly to the hard drive. The program then notifies the user that the operations for that particular commercial spot are completed and returns the program to the start position.

Figure 8A:
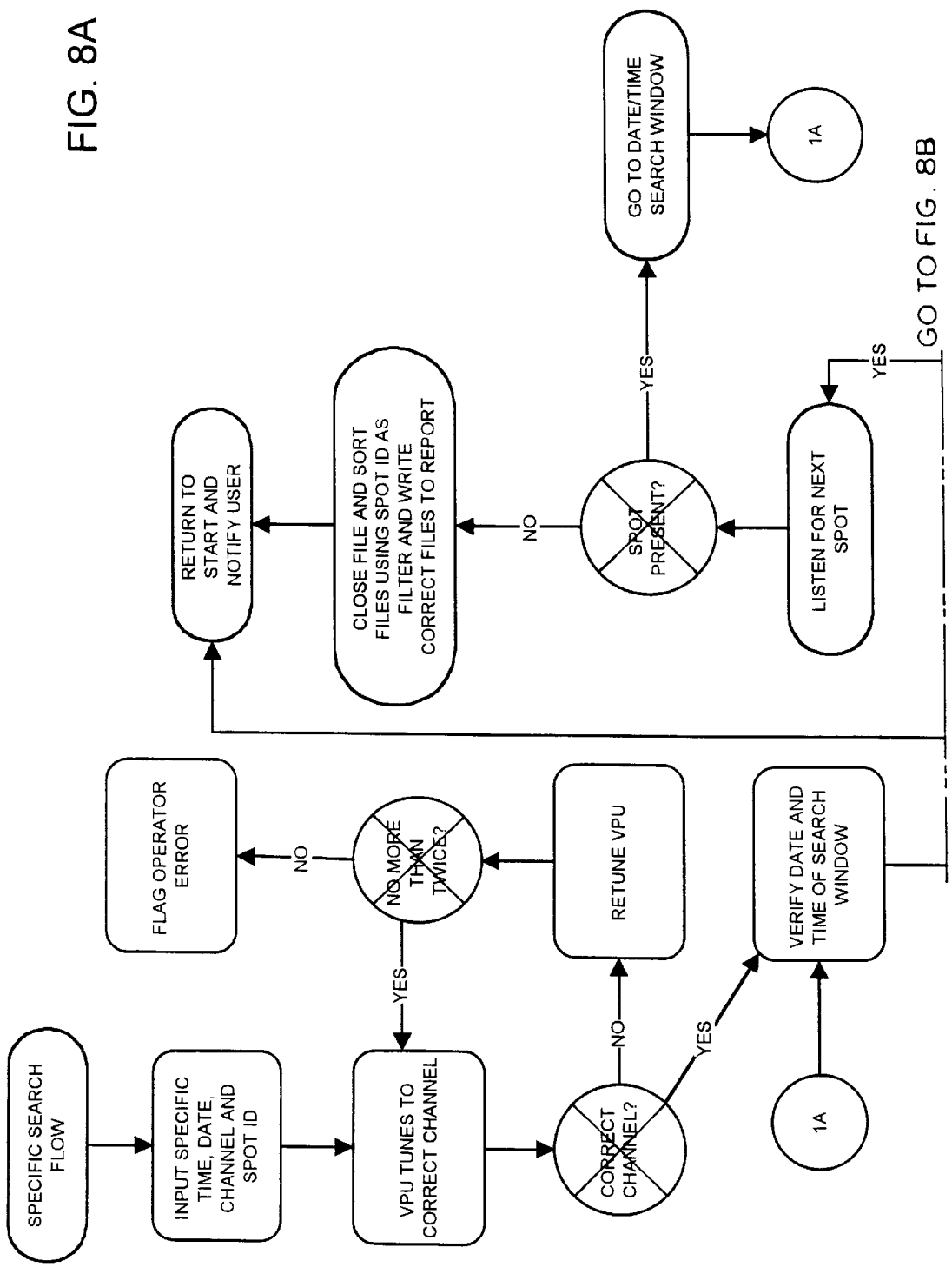
FIGS. 8a and 8b are flow diagrams illustrating additional program instructions that are executed by the computer/microcontroller shown in FIGS. 1 and 2.
Figure 8B:
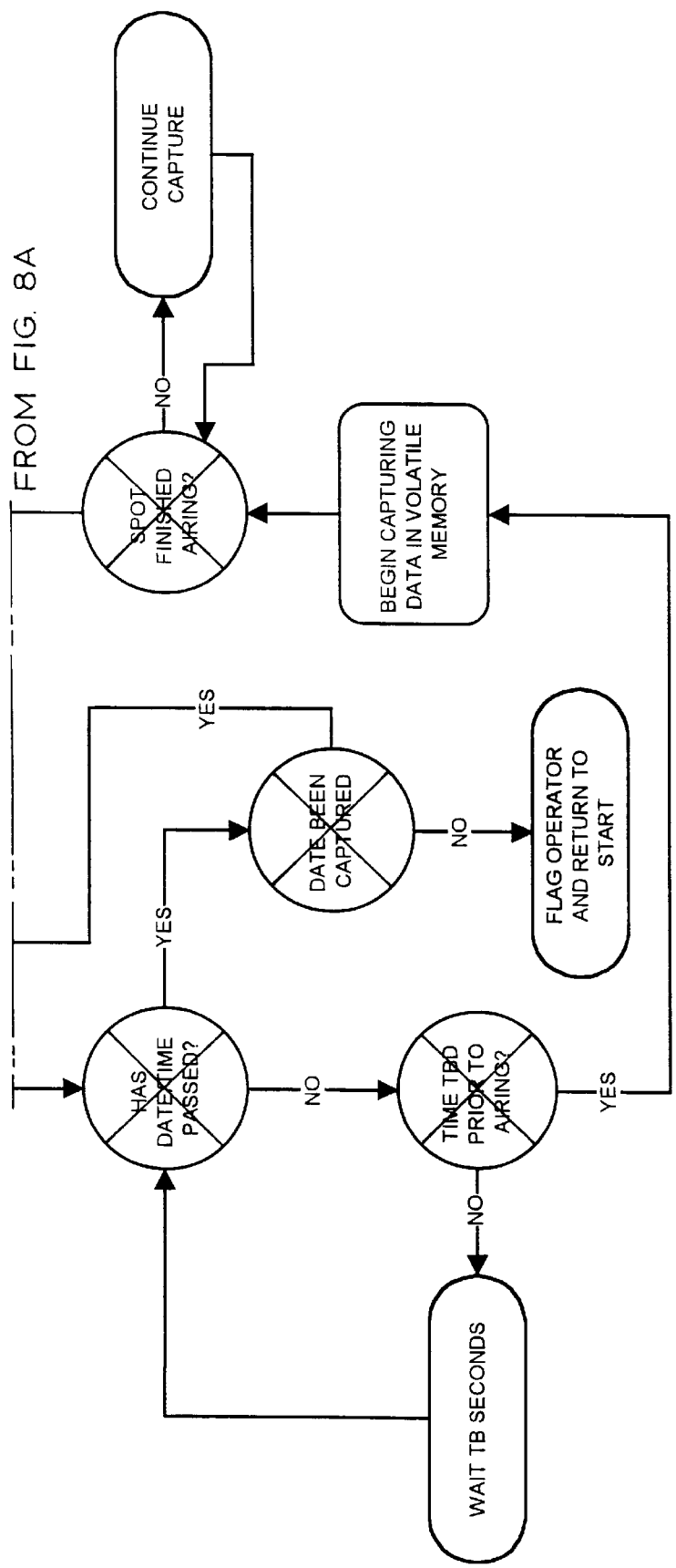

As previously described in connection with FIGS. 6a and 6b, when there is no schedule air time for the commercial, the user inputs a channel to the microcontroller 58 for automatic tuning, and the program inquires whether the search should be a specific search or a global search. FIGS. 8a and 8b illustrate the program procedures when the desired search is a specific search. As shown in FIGS. 8a and 8b, the specific search procedures begin by requesting an input of the specific time, date, channel, and spot ID of the commercial of interest. The microcontroller 58 then automatically tunes to the correct channel, and verifies the date and time of the search window. If the date and time is within a predetermined time period before the desired time, the program moves to the operation entitled "Begin Capturing Data in Volatile Memory". After the data is captured in the system RAM 70, the program monitors the data flow to determine whether or not a subsequent commercial spot is present. If such a commercial spot is detected, the program moves to the date and time search window, then returns to the verify date and time of search window procedure. If it was determined that no subsequent commercial spot is present, the program closes the file and sorts the files using the spot ID as a filter for writing the correct files to a report. The program then returns to start and notifies the user.

Figure 9:
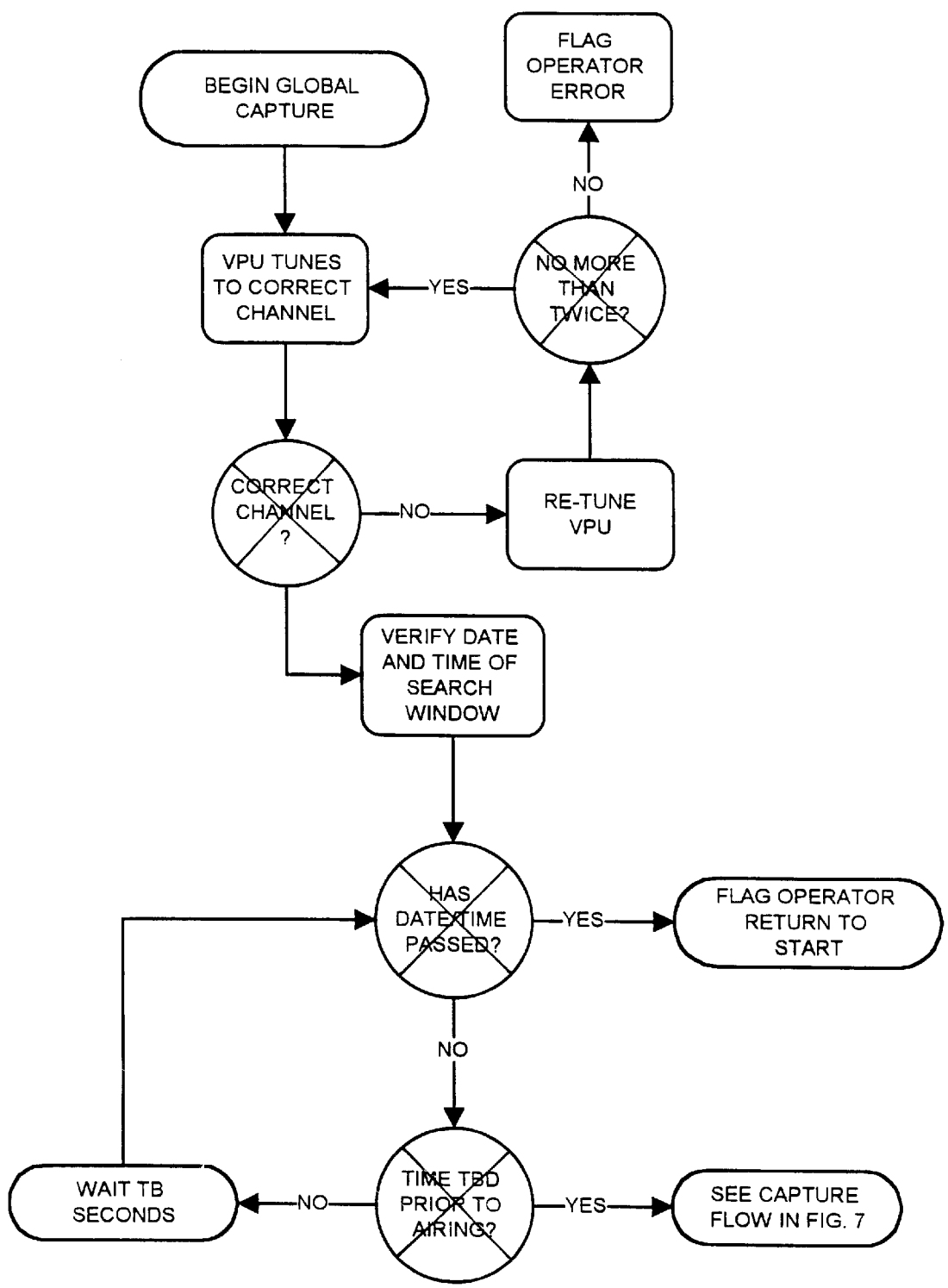
FIG. 9 is a flow diagram illustrating additional program instructions that are executed by the computer/microcontroller shown in FIGS. 1 and 2.

FIG. 9 illustrates a flow diagram of the procedures that are followed for a global capture of advertisement reconciliation data. At the beginning of this procedure the microcontroller 58 tunes to the channel that was previously input by the user. If the program determines that the correct channel has been tuned to, the program then verifies the date and time of the window search. When the date and time approach a predetermined period before the entered date and time, the program proceeds to capture data according to the flow diagram set forth in FIG. 7.

The method and apparatus of the present invention has now accumulated in a memory file the ad reconciliation data, along with a time stamp showing the precise time at which the advertisement was actually received. This information may now be printed out for easy manual reconciliation with the contracted terms under which the commercial should have been broadcast. Alternatively, the reconciliation procedures could proceed automatically according to simple comparison and matching program instructions written into either the microcontroller 58 of the video processor unit 36 or the computer 38. These comparison programming steps could automatically determine that either the agreed upon contract terms were met exactly or that there are discrepancies, and further could point out the exact location of these discrepancies, with all of these operations proceeding automatically under program control.

Of course, it should be understood that a range of changes and modifications can be made to the preferred embodiment described above. For example, the present invention is described in connection with a particular hardware and processing structure for transmitting and receiving digital programming and related data. However, a wide variety of transmitting and receiving structures could be utilized as long as the essential advertisement reconciliation features described herein are present. For example, the receive antennae could be larger than 18 inches. The digital transmission format could be digital cable, LMDS, MMDS, or other similar formats. It is therefore intended that the foregoing detailed description be regarded as illustrative rather than limiting and that it be understood that it is the following claims, including all equivalents, which are intended to define the scope of this invention.

What is claimed is:

1. A method of determining the receipt of an advertisement, the steps comprising:

receiving from a remote location digital data comprising programming, an advertisement and advertisement reconciliation data;

said advertisement reconciliation data comprising the scheduled air time of said advertisement, along with timing information related to the actual air time of said advertisement;

using said timing information to determine the actual air time of said advertisement: and passing at least some of said advertisement reconciliation data to a processor.

2. The method of claim 1 wherein:

said digital data is received by a satellite antenna coupled to a video processor unit;

said processor is part of said video processor unit.

3. The method of claim 1 wherein:

said digital data is received by a satellite antenna coupled to a video processor unit; and said processor is part of a computer coupled to said video processor unit.

4. The method of claim 3 further comprising the step of passing said advertisement reconciliation data to a printer.

5. The method of claim 3 further comprising the step of passing said advertisement reconciliation data to a billing center.

6. A method of broadcasting advertisements, the steps comprising:

generating digital data comprising an advertisement and advertisement reconciliation data;

said advertisement reconciliation data comprising at least the makegood status of said advertisement;

modulating said digital data on a carrier; and broadcasting said modulated digital data at said carrier frequency.

7. The method of claim 6 wherein:

said carrier frequency is suitable for reception by a satellite;

said satellite receives said modulated digital data at said carrier frequency, shifts it to a second carrier frequency and re-broadcasts said digital data at said second carrier frequency.

8. The method of claim 7 wherein said advertisement reconciliation data comprises a scheduled date associated with said advertisement.

9. The method of claim 7 wherein said wherein said advertisement reconciliation data comprises a scheduled duration associated with said advertisement.

10. The method of claim 7 wherein said advertisement reconciliation data comprises an identification code identifying said advertisement.

11. The method of claim 7 wherein said advertisement reconciliation data comprises the contract number under which said advertisement was purchased.

12. The method of claim 7 wherein said advertisement reconciliation data comprises the particular order line number of a contract under which the advertisement was purchased.

13. The method of claim 7 wherein said advertisement reconciliation data comprises:

a scheduled duration associated with said advertisement;

an identification code identifying said advertisement;

a contract number under which said advertisement was purchased; and a scheduled date for receipt of said advertisement.

14. A device for confirming the transmission of advertisements, the device comprising:

an antenna for receiving a modulated digital data stream comprising advertisement reconciliation data associated with at least one advertisement;

said advertisement reconciliation data comprising at least the makegood status of said at least one advertisement:

a tuner in communication with said antenna and receiving said modulated digital data stream;

a demodulator in communication with said tuner and demodulating said modulated digital data stream and outputting a demodulated digital data stream;

a transport in communication with said demodulator and receiving said demodulated digital data stream and routing said advertisement reconciliation data to a processor.

15. The device of claim 14 wherein:

said antenna comprises a satellite antenna; and said tuner, demodulator and transport are housed in a video processor coupled to said antenna.

16. The device of claim 15 wherein said processor is housed in said video processor unit.

17. The device of claim 15 wherein said processor is housed in a computer coupled to said video processor unit.

18. The device of claim 14 further comprising a printer coupled to said processor, said advertisement reconciliation data being passed to said printer.

19. The device of claim 14 wherein said advertisement reconciliation data comprises a scheduled date associated with said advertisement.

20. The device of claim 14 wherein said advertisement reconciliation data comprises a scheduled duration associated with said advertisement.

21. The device of claim 14 wherein said advertisement reconciliation data comprises an identification code identifying said advertisement.

22. The device of claim 14 wherein said advertisement reconciliation data comprises the contract number under which said advertisement was purchased.

23. The device of claim 14 wherein said advertisement reconciliation data comprises the particular order line number of a contract under which the advertisement was purchased.

24. The device of claim 15 wherein said advertisement reconciliation data comprises:

a scheduled duration associated with said advertisement;

an identification code identifying said advertisement;

a contract number under which said advertisement was purchased; and a scheduled date for receipt of said advertisement.

25. The method of claim 4 wherein:

said printer prints a report containing at least said scheduled air time and said actual air time; and a person uses said report and said scheduled air time and said actual air time to manually perform advertisement reconciliation activities for said advertisement.

26. The method of claim 1 wherein said processor automatically compares said scheduled air time with said actual air time.

27. The method of claim 1 wherein said processor automatically determines whether or not there is a discrepancy between said scheduled air time and said actual air time.

* * * * *